United States Patent
Kasal et al.

(10) Patent No.: US 6,599,117 B2
(45) Date of Patent: Jul. 29, 2003

(54) TOGGLE LEVER CLAMPING APPARATUS FOR INJECTION MOLDING MACHINE

(75) Inventors: Toshihiro Kasal, Numazu (JP); Akihide Okubo, Numazu (JP); Nobuyuki Asanuma, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 77 days.

(21) Appl. No.: 09/910,864

(22) Filed: Jul. 24, 2001

(65) Prior Publication Data

US 2002/0022069 A1 Feb. 21, 2002

(30) Foreign Application Priority Data

Jul. 26, 2000 (JP) .......................... 2000-225107

(51) Int. Cl.⁷ ............................................. B29C 45/64
(52) U.S. Cl. ....................................... 425/593; 425/595
(58) Field of Search ................................ 425/589, 593, 425/595

(56) References Cited

U.S. PATENT DOCUMENTS 4,984,980 A * 1/1991 Ueno ........................ 425/595
5,297,952 A * 3/1994 Leonhartsberger .......... 425/593
5,454,709 A * 10/1995 Leonhartsberger et al. .. 425/589
5,511,963 A * 4/1996 Hehl ........................... 425/593

FOREIGN PATENT DOCUMENTS

DE          23 13 183        10/1974

* cited by examiner

Primary Examiner—James P. Mackey
(74) Attorney, Agent, or Firm—Pillsbury Winthrop LLP

(57) ABSTRACT

A drive unit (21) is actuated to rotate a ball screw (20). Then, a ball nut (19) included in the ball screw and a cross bead (18) advance toward a movable platen (16) to extend a toggle link mechanism (17) gradually. Consequently, the movable platen (16) advances along tie bars (14), a movable platen support member (24) attached to the movable platen (16) moves on a base frame (11) and a movable mold (22) is brought into contact with a stationary mold (23). When the mold consisting of the movable mold (22) and the stationary mold (23) is thus clamped, a part of the frame provided with a recess (27) of the movable platen support member (24) is deformed elastically to permit the deformation of the movable platen (16) and movable mold (22). Thus the movable platen (16) is not restrained from deformation, clamping force can be uniformly applied to the mold and accurate moldings can be molded.

8 Claims, 4 Drawing Sheets

TOGGLE LEVER CLAMPING APPARATUS FOR INJECTION MOLDING MACHINE

BACKGROUND OF THE INVENTION

1. Field of the Invention

The present invention relates to a toggle lever clamping apparatus for an injection molding machine and, more particularly, to a toggle lever clamping apparatus for an injection molding machine, having a movable platen support member disposed movably on a base frame for supporting the movable platen movably along tie bars, and capable or linearly moving the movable platen relative to a stationary platen to open and close a mold an of producing a clamping force to clamp the mold.

2. Description of the Related Art

A conventional toggle lever clamping apparatus for an injection molding machine is provided with a movable platen support member which is capable of moving on a base frame. This movable platen support member is attached to a lower part of a movable platen to support it so that the toggle type clamping system achieves stable mold opening and closing operations maintaining the parallelism of the movable and the stationary mold. The movable platen support member has a frame, and rollers or wedge-shaped sliders (linear guides in some cases) supported on front and back parts of the frame on the front and the back side of the movable platen, respectively. The movable platen support platen member prevents the tilting of the movable platen during the movement of the movable platen for mold opening and closing operations, suppresses the bending of the tie bars when the movable part of the mold is attached to the movable platen and maintains the parallelism of the movable and the stationary part of the mold when the mold is opened and closed.

Referring to FIG. 4, a conventional toggle lever clamping system for an injection molding machine includes a stationary platen 32 fixedly set on a base frame 31 to support a stationary part 43 of a mold, a link housing 33 placed near the left end, as viewed in FIG. 4, of the base frame 31 so as to be movable toward and away from the stationary platen 32, tie bars 32 extended through the four corners of the stationary platen 32 and the link housing 33, a movable platen 36 disposed opposite to the stationary platen 32, engaging the tie bars 34 and capable of holding the movable part 42 of the mold, a toggle link mechanism 37 having opposite ends respectively attached to the link housing 33 and the movable platen 36, a movable platen support member 44 provided with a front roller 45 and a back roller 45 capable of rolling on the base frame 31.

When closing and clamping the mold, the conventional toggle lever clamping system exerts forces F1 and F2 on the movable platen 36. The forces F1 and F2 strain the movable platen 36 such that the back surface of the movable platen 36 is stretched and the movable platen 36 warps in the direction of the forces F1 and F2 accordingly. As the movable platen support member 44 prevents the movable platen 36 from warping and force F2 presses the back roller 46 of the movable platen support member 44 strongly against the base frame 31, which affects the life of the movable platen support mechanism 44 significantly and, in some cases, causes the movable platen support member 44 to be broken.

A force F4 caused by a reaction force F3 that acts on the lower back part of the movable platen 36 prevented from being warped by the force F2 acts on an upper part of the movable platen 36. Thus, the upper and the lower part of the movable platen 36 are warped differently. The unbalance in warping between the upper and the lower part of the movable platen 36 causes uneven application of mold clamping force to the mold causes irregular thickness distribution in the walls of a molding or difference in the amount of a molding material injected into the cavities of the mold between the cavities when the mold is a multicavity mold.

SUMMARY OF THE INVENTION

Accordingly, it is an object of the present invention to provide a toggle lever clamping apparatus for an injection molding machine, capable or solving the aforesaid problems in the conventional toggle lever clamping apparatus, of carrying out stable mold opening and closing operations, and of applying a mold clamping force uniformly to the mold to enable molding highly accurate moldings which are not different from each other in size and weight.

According to a first aspect of the present invention, a toggle lever clamping apparatus for an injection molding machine, comprises: a movable platen support member disposed movably on a base frame for supporting a movable platen supported on and guided for movement by tie bars; a toggle link mechanism for linearly moving the movable platen relative to a stationary platen to open and close a mold and for applying mold clamping force to the movable platen to clamp the closed mold; and a cushioning means for absorbing a component of the clamping force that acts on the movable platen support member when the mold is clamped so that the movable platen is allowed to be deformed for balance.

The toggle lever clamping apparatus is capable of achieving stable mold opening and closing operations, and the cushioning mechanisms included in the movable platen support mechanism permits the deformation of the movable platen when the mold is clamped. Consequently, the mold clamping force can be uniformly applied to the mold and accurate moldings which are not different from each other in size and weight can be obtained.

According to a second aspect of the present invention, the cushioning means includes a elastic member for supporting the lower back end of the movable platen on the base frame.

This toggle lever clamping apparatus is capable of achieving stable mold opening and closing operations, and the elastic mechanism included in the movable platen support mechanism permits the deformation of the movable platen when the mold is clamped. Consequently, the mold clamping force can be uniformly applied to the mold and accurate moldings which are not difficult from each other in size and weight can be obtained.

The elastic means may include coil springs or coned disk springs.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
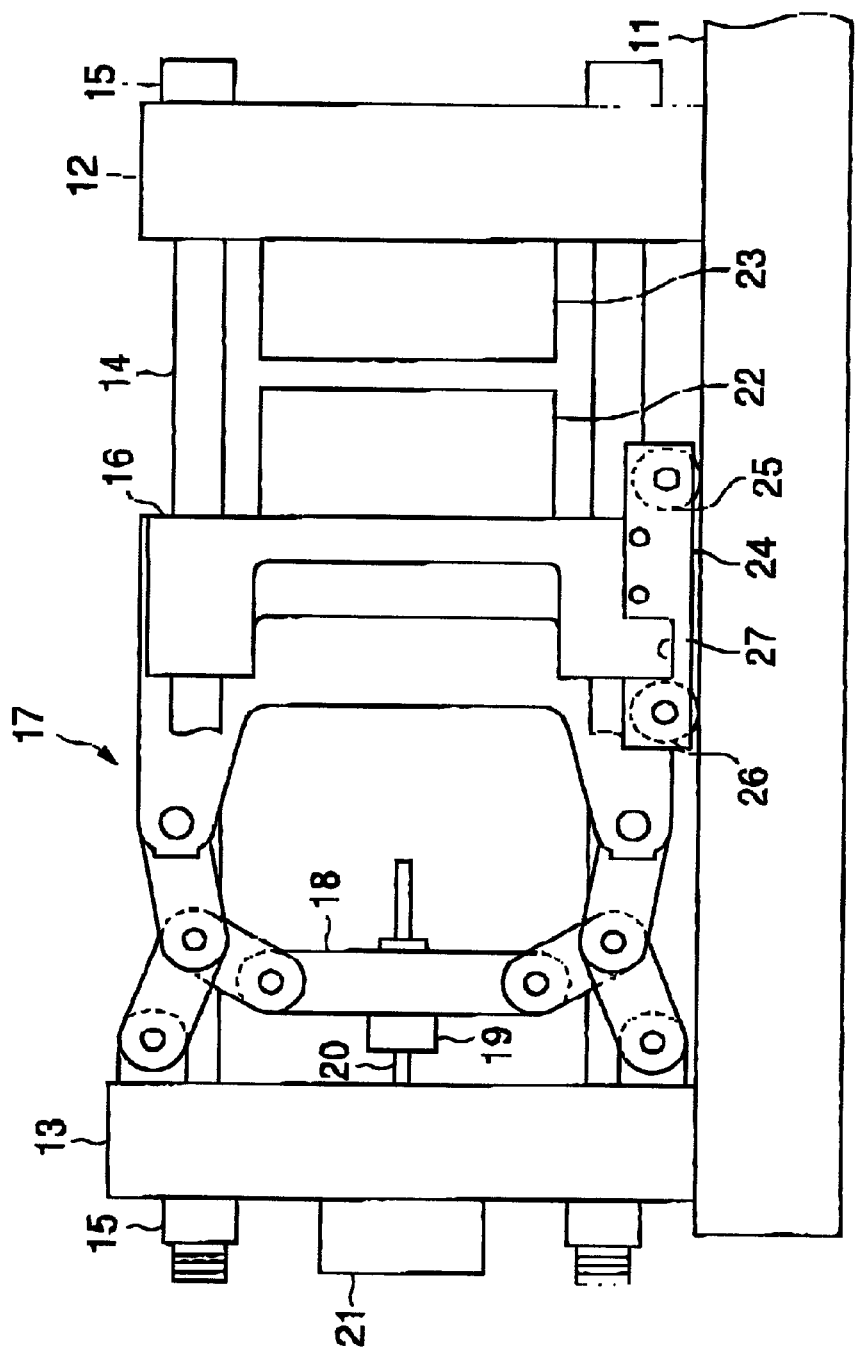
FIG. 1 is a front elevation of a toggle lever clamping system in a first embodiment according to the present invention for an injection molding machine.
Figure 2:
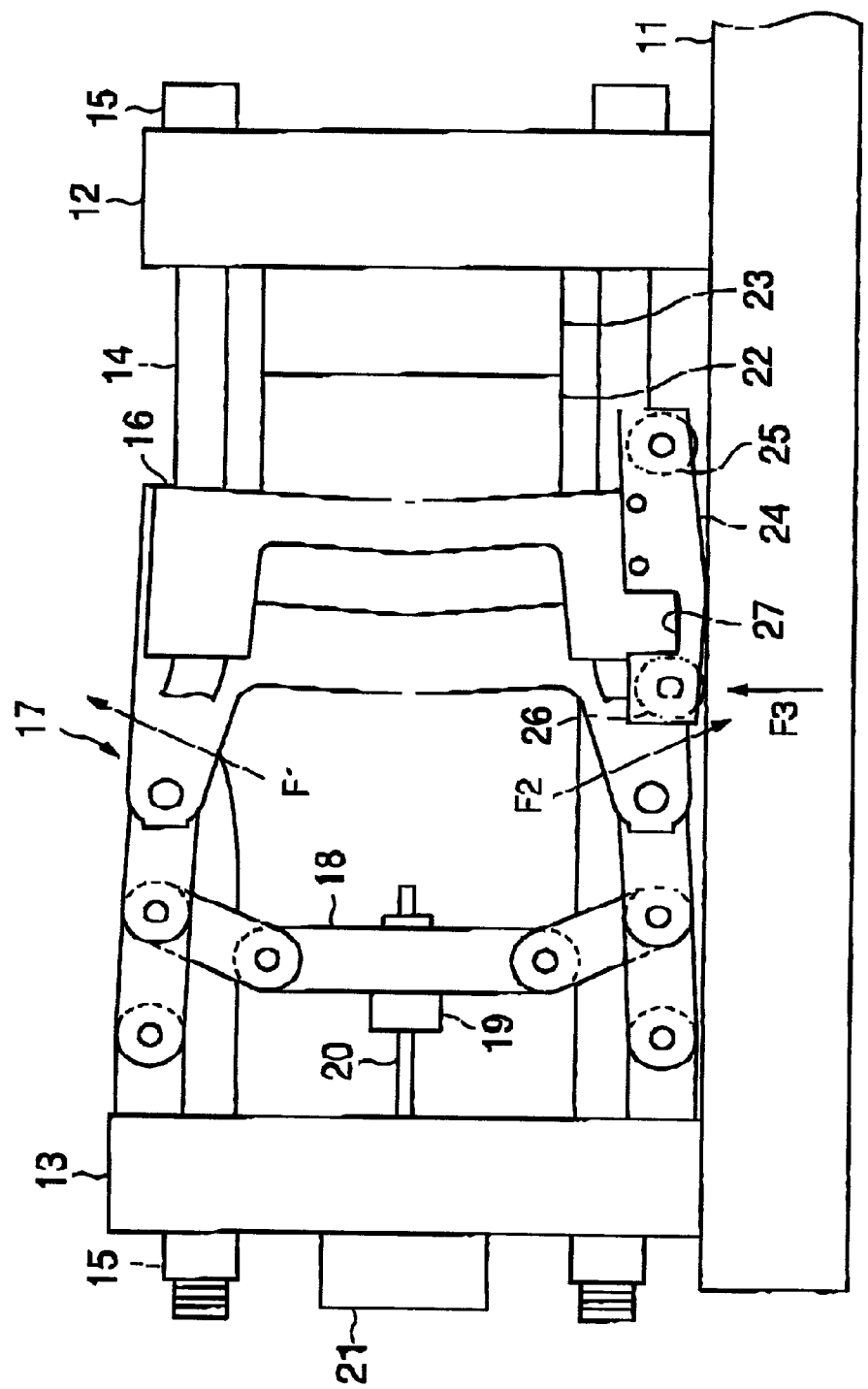
FIG. 2 is a front elevation of the toggle lever clamping system shown in FIG. 1 in a mold clamping state.

FIGS. 1 and 2 shows a toggle lever clamping apparatus in a first embodiment according to the present invention for an injection molding machine. Four tie bars 14 are extended parallel between four corner parts of a stationary platen 12 fixedly set on a base frame 11 and four corner parts of a link housing 13 set on the base frame 11 so as to be axially movable. Tie bar nuts 15 are screwed on right end parts, as viewed in FIG. 1, of the tie bars 14 are extended through the link housing 13 and project to the left from the link housing 13. Tie bar nuts 15 are screwed on the threaded right end parts of the tie bars 14 to fasten the link housing 13 to the tie bars 14. The tie bar nuts 15 are able to rotate relative to the link housing 13 and are unable to move axially relative to the link housing 13. The tie bar nuts 15 are rotated to move the link housing along the threaded end parts of the tie bars 14.

A movable platen 16 having four corners engaging the tie bars 15 is disposed between the link housing 13 and the stationary platen 13. The movable platen 16 is connected to the link housing 13 by a toggle link mechanism 17. The movable platen 16 is moved forward and relative to the link housing 13 by the toggle link mechanism 17. The toggle link mechanism is provided with a cross head 18 is combined with the toggle mechanism 17 which extend and contract the toggle link mechanism 17. A ball nut 19 is fixed to the cross head 18. The threaded rod 20 is supported for rotation on the link housing 13. A driving unit 21 provided with a built-in motor, not shown, is held on the back surface, i.e., a left surface as viewed in FIG. 1, of the link housing 13.

A movable mold 22 is held on the movable platen 16 and a stationary mold 23 is held on the stationary platen 32. A movable platen support member 24 including a frame and a front roller 25 and a back roller 26 is fixed to a lower part of the movable platen 16. The movable platen support member 24 moves forward and backward with the front roller 25 and back roller rolling on the base frame 11. As shown in FIG. 1, the frame of the movable platen 24 has a middle part and a front part, i.e., a right-hand part as viewed in FIG. 1, fastened to the lower part of the movable platen 16 with bolts or the like. A U-shaped recess 27 is formed in a part of the frame of the movable platen support mechanism 24 between the middle part and a part holding the back roller 26 to form a cushioning structure.

The operation of the toggle lever clamping apparatus will be explained with reference to FIG. 2. The movable mold 22 and the stationary mold 23 are mounted on the movable platen 16 and the stationary platen 12, respectively. The part of the frame provided with the recess 27 of the movable platen support member 24 attached to the movable platen 16 does not yield to a force on the order of the weight of the movable mold 22. Therefore, the tie bars 14 are not bend and the movable mold 22 and the stationary mold 23 remain parallel to each other. When the driving unit 21 is actuated to rotate the ball screw 20, the ball nut 19 and the cross head 18 advance toward the movable platen 16 to extend the toggle link mechanism 17 gradually. Consequently, the movable platen 16 advances along the tie bars 14, the movable platen support mechanism 24 together with the movable platen 16 moves on the base frame 11 and the movable mold 22 is brought into contact with the stationary mold 23. Thus the mold consisting of the movable mold 22 and the stationary mold 23 is closed. In this state, the part of the frame provided with the recess 27 of the movable platen support member 24 is not deformed and the movable mold 22 and the stationary mold 23 remain parallel to each other.

The toggle link mechanism is further extended to a fully extended state to exert mold clamping force to the closed mold. In this state, forces F1 and F2 strain the movable platen 16 such that the back surface, i.e., the surface not holding the movable mold 22, of the movable platen 16 is stretched in the direction of forces F1 and F2 and the movable platen 16 warps accordingly. The force F2 presses the back roller 26 of the movable platen support member 24 strongly against the base frame 11. A reaction force F3 resulting from the force F2 is exerted on the movable platen support member 24 to cause deformation. As the U-shaped recess 27 in the movable platen support member 24 adds the resilient function similar to a belleville spring to the entire frame of the movable platen support member 24, the movable platen support member 24 deforms to serve as a cushioning means that is enable to absorbs the reaction force F3. Therefore, the movable platen 16 and the movable mold 22 are allowed to cause a balanced deform. Thus stable mold opening and closing operations can be carried out, a mold clamping force can be uniformly applied to the mold and, consequently, higher accurate moldings which are not different from each other in size and weight can be molded.

Figure 3:
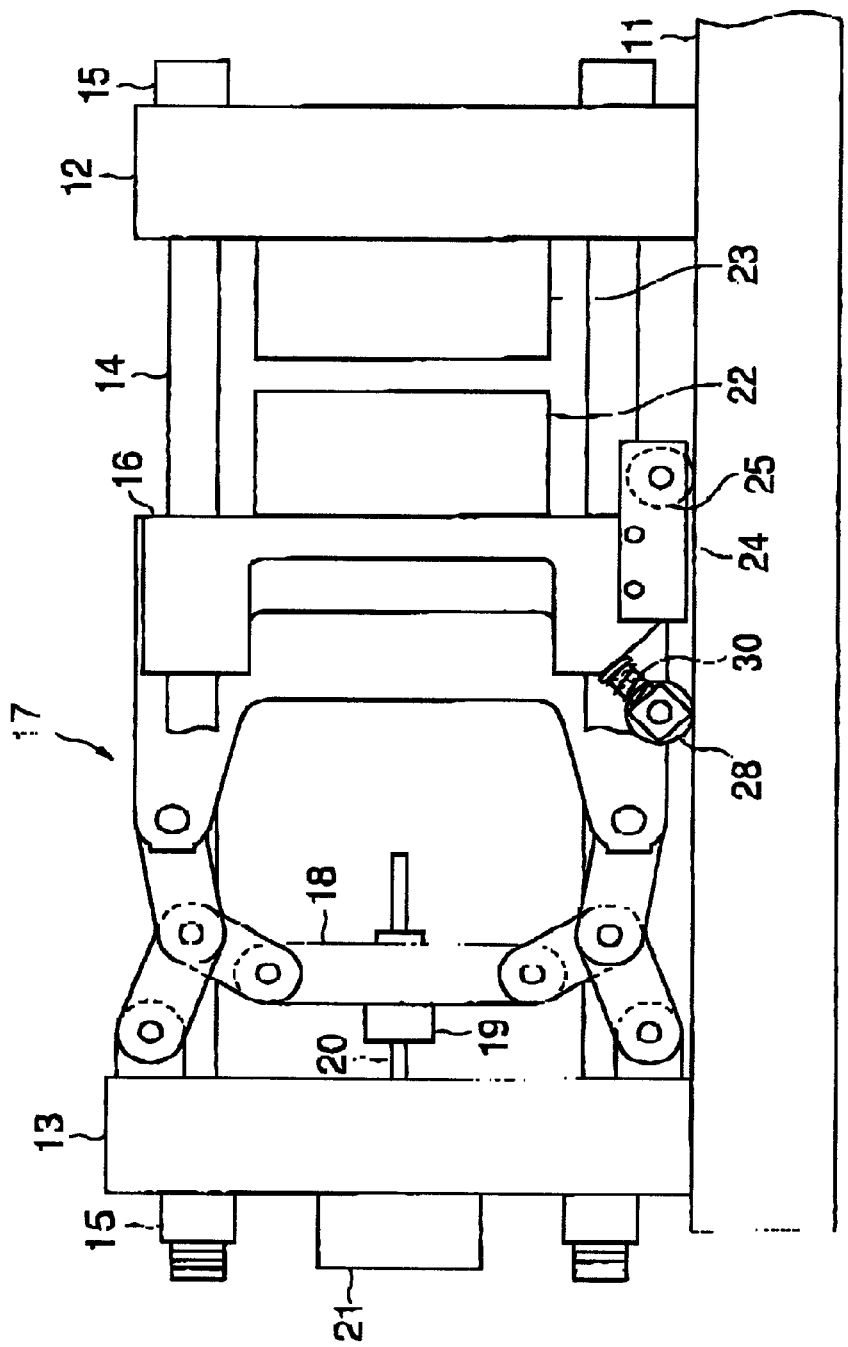
FIG. 3 is a front elevation of a toggle lever clamping system in a second embodiment according to the present invention for an injection molding machine.
Figure 4:
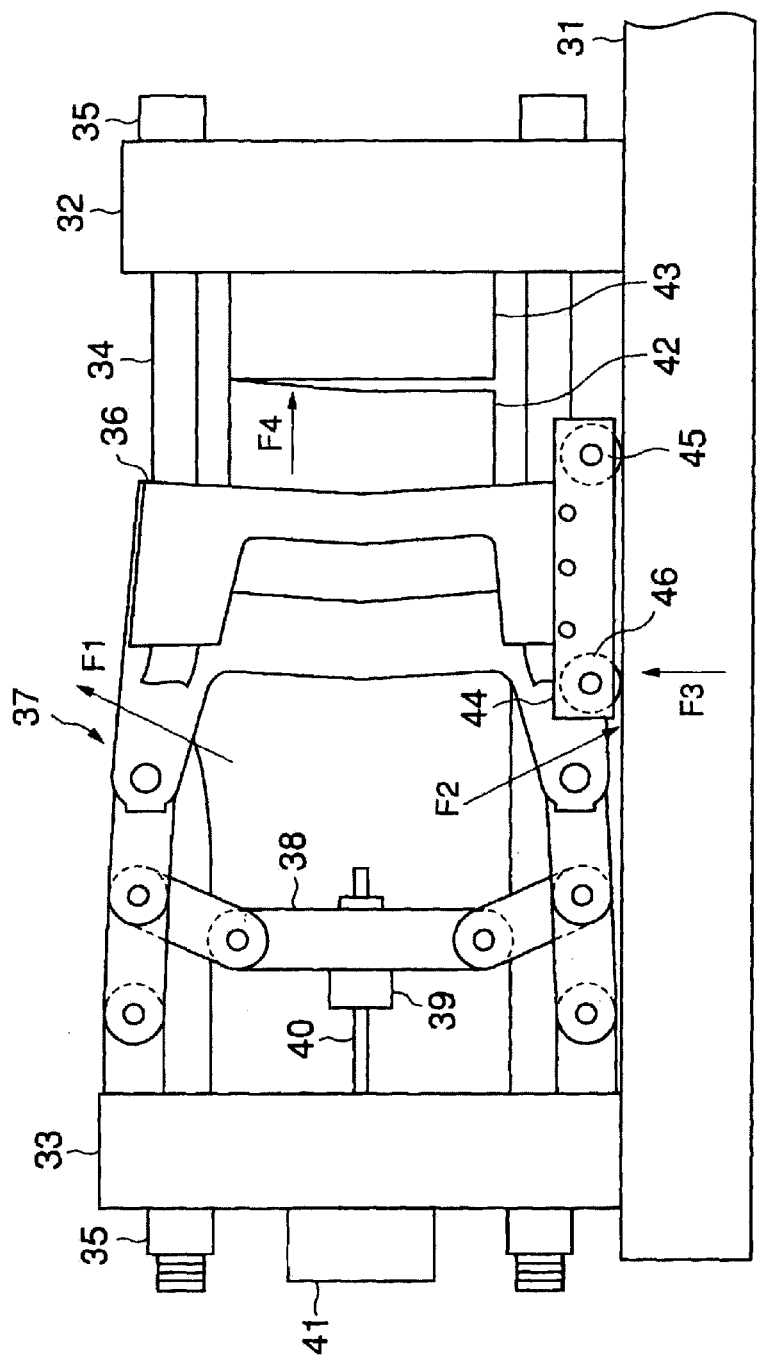
FIG. 4 is a front elevation of a conventional toggle lever clamping system for an injection molding machine, or assistance in explaining the deformation of a movable platen.

FIG. 3 shows a toggle lever clamping apparatus in a second embodiment according to the present invention for an injection molding machine. This toggle lever clamping apparatus is basically the same in construction as that in the first embodiment, except that the former has a movable platen support member 24 different from that of the latter.

Referring to FIG. 3, the movable platen support mechanism 24 has a frame, a front roller 25 supported on a front end part of the frame. In this embodiment, a back roller 28 resiliently connected by coil springs 30 to a lower left-hand part, as viewed in FIG. 3, of a movable platen 16. The coil springs 30 are designed such that the coil springs 30 are deformed very slightly by a force on the order of the weight of a movable mold 22 mounted on the movable platen 14 and is deformed considerably when a mold clamping force is exerted on the mold. Generally, the weight of a mold used on an injection molding machine is far less than mold clamping force and is about 1% or below of mold clamping force. Therefore, the coil springs 30 can be easily designed.

When the clamping force is exerted on the movable platen 16, the coil spring 30 is deformed to allow a balanced deformation of the movable platen 16 without restraining the movable platen 16 from deformation, thus, mold clamping force can be uniformly applied to the mold and hence accurate moldings can be molded.

As apparent from the foregoing description, according to the present invention, the toggle lever clamping apparatus for an injection molding machine permits the deformation of the movable platen when the mold is clamped and, consequently, the mold clamping force can be uniformly applied to the mold and accurate moldings which are not different from each other in size and weight can be obtained.

Although the invention has been described in its preferred embodiment with a certain degree of particularity, obviously many changes and variations may be made therein. For example, belleville springs may be used instead of the coil springs 30 in the second embodiment. It is therefore to be understood that the present invention may be practiced otherwise than as specifically described herein without departing from the scope and spirit thereof.

What is claimed is:

1. A toggle lever clamping apparatus for an injection molding machine, comprising:
   a movable platen support member disposed movably on a base frame for supporting a movable platen supported on and guided for movement by tie bars;

a toggle link mechanism for linearly moving the movable platen relative to a stationary platen to open and close a mold and for applying mold clamping force to the movable platen to clamp the closed mold; and a cushioning means for absorbing a component of the clamping force that acts on the movable platen support member when the mold is clamped so that the movable platen is allowed to be deformed for balance.

2. The toggle lever clamping apparatus according claim 1, wherein the cushioning means includes the movable platen support member having a cushion portion adding a resilient function to the movable platen support member.

3. The toggle lever clamping apparatus according claim 2, wherein the cushion portion is a U-shaped recess formed in the movable platen support member.

4. The toggle lever clamping apparatus according claim 3, wherein the movable platen support member is provided with a front roller and a back roller rolling on the base frame, and the U-shaped recess is formed at a position between an attached portion of the back roller and a fixed portion of the movable platen.

5. The toggle lever clamping apparatus according claim 1, wherein the cushioning means includes an elastic member for supporting the lower back end of the movable platen on the base frame.

6. The toggle lever clamping apparatus according claim 5, wherein the elastic member is attached at a position between a roller rolling on the base frame and the movable platen.

7. The toggle lever clamping apparatus according to claim 6, wherein the elastic member includes coil springs.

8. The toggle type mold clamping system according to claim 6, wherein the elastic member includes belleville springs.

* * * * *

UNITED STATES PATENT AND TRADEMARK OFFICE
CERTIFICATE OF CORRECTION

PATENT NO.    : 6,599,117 B2                                    Page 1 of 1
DATED         : July 29, 2003
INVENTOR(S)   : Kasai et al.

It is certified that error appears in the above-identified patent and that said Letters Patent is hereby corrected as shown below:

<u>Title page,</u>
Item [75], Inventors, change "Toshihiro Kasal" to -- Toshihiro Kasai --.

Signed and Sealed this

Sixteenth Day of December, 2003

JAMES E. ROGAN
*Director of the United States Patent and Trademark Office*